Figure 1:
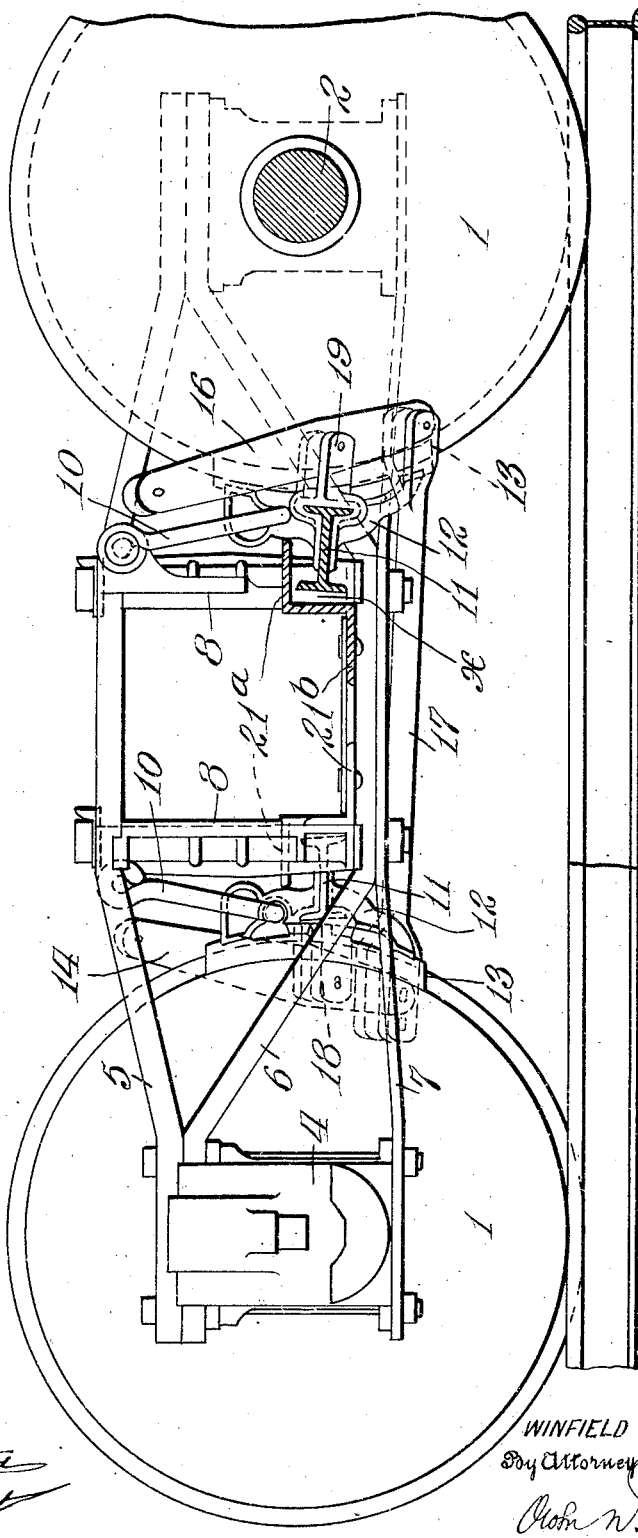

W. H. YOST.
CAR TRUCK.
APPLICATION FILED DEC. 20, 1911.

1,048,022.

Patented Dec. 24, 1912.

3 SHEETS—SHEET 1.

Witnesses

Inventor
WINFIELD HANCOCK YOST
By Attorney

W. H. YOST.
CAR TRUCK.
APPLICATION FILED DEC. 20, 1911.

1,048,022.

Patented Dec. 24, 1912.
3 SHEETS—SHEET 3.

Fig. 3.

Witnesses

Inventor
WINFIELD HANCOCK YOST
By Attorney

UNITED STATES PATENT OFFICE.

WINFIELD HANCOCK YOST, OF MONTREAL, QUEBEC, CANADA, ASSIGNOR TO THE HART-OTIS CAR COMPANY LIMITED, OF MONTREAL, CANADA, A CORPORATION.

CAR-TRUCK.

1,048,022.   Specification of Letters Patent.   Patented Dec. 24, 1912.

Application filed December 20, 1911. Serial No. 667,010.

*To all whom it may concern:*

Be it known that I, WINFIELD HANCOCK YOST, a citizen of the United States, residing in the city of Montreal, Province of Quebec, Canada, have invented certain new and useful Improvements in Car-Trucks; and I do hereby declare that the following is a full, clear, and exact description of the same.

This invention is particularly adapted for application to the trucks of dump cars and it has for its object to provide a novel means for preventing material from lodging between the brake beam and contiguous parts and interfering with the proper operation of the brakes, the invention being particularly designed to prevent material such as stones, pieces of coal or the like becoming jammed between the brake beam and the usual spring planks of the truck which extend transversely of the latter adjacent the brake beam.

For further comprehension of the invention, and of the objects and advantages thereof reference will be had to the following description and appended claims, and to the accompanying drawings forming a part of this specification in which similar reference characters indicate the same parts and wherein—

Figure 2:
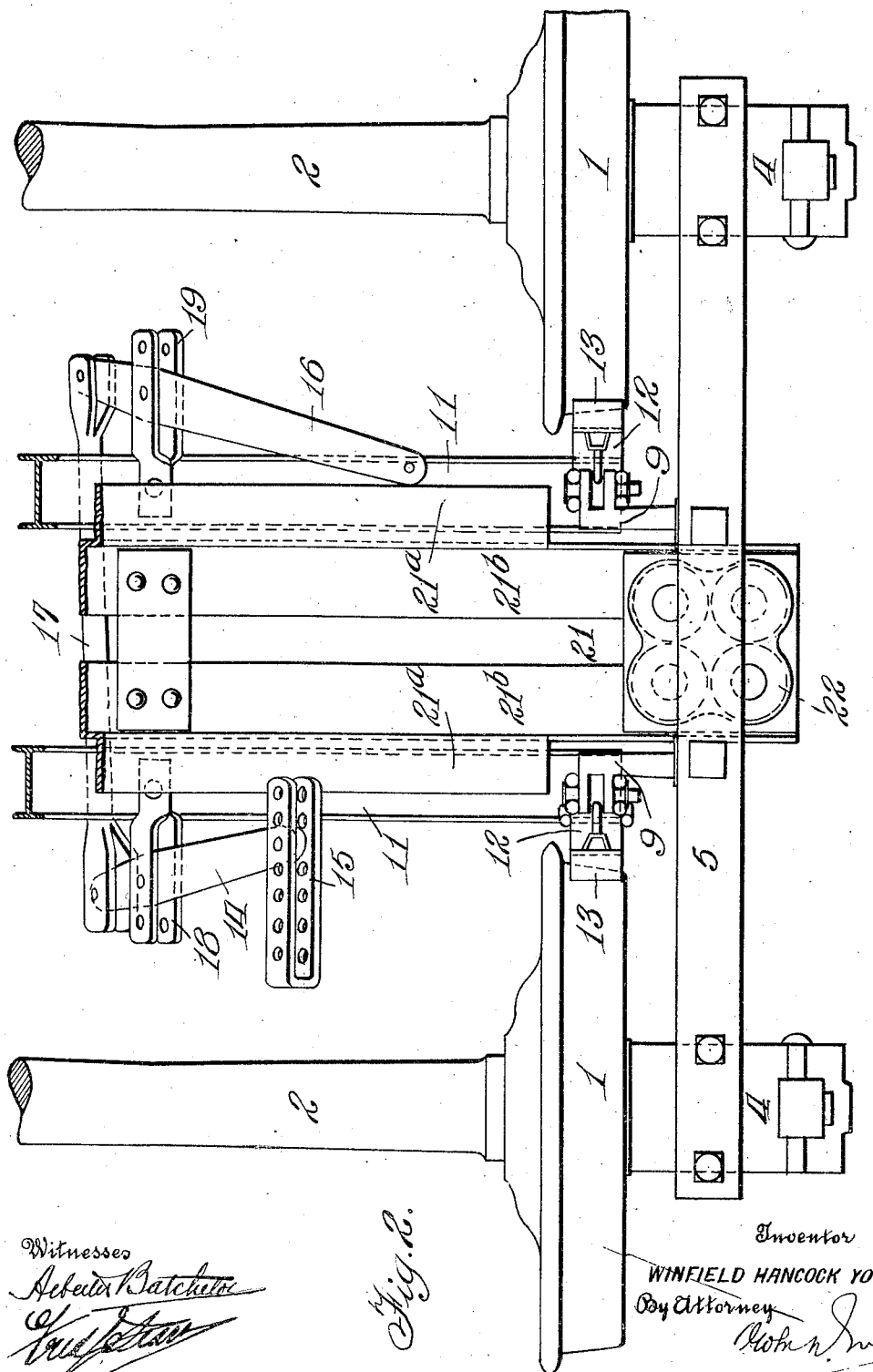

Figure 1 is a side elevation, partly in section, of a car truck having my invention embodied therein; Fig. 2 is a plan view of one side thereof; and Fig. 3 is a transverse vertical section taken on the line 3 3 Fig. 2, a portion of the car body bolster being shown.

Referring now to the drawings 1 indicates the wheels of a car truck, 2 the axles, 4 the journal boxes, 5 and 6 the top and bottom arch bars respectively, 7 the tie bars, 8 the truck columns, which latter have secured thereto the brake hanger brackets 9; from which are suspended the brake hangers 10 carrying the brake beam 11 with its brake heads and brake shoes 12 and 13 respectively. Of the brake operating means the dead lever is shown at 14 and is pivoted on the dead lever stop 15, and connected to the live lever 16 by the bottom connection 17, these levers fulcruming upon the usual brake beam fulcrums 18 and 19. The truck and body bolster are indicated at 20 and 21 respectively in Fig. 3. All these parts may be of usual or approved type, the detail construction thereof forming no part of the present invention.

21 indicates the "spring planks", which is the name usually given to the beams which extend transversely of the truck adjacent the brake beams and tie together the lower arch bars 6 and have the springs 22 resting on the ends thereof. In order to prevent material lodging between these spring planks and the brake beams I have provided a cover extending from each spring plank over the adjacent brake beam. In this embodiment of my invention the cover is made integral with the spring plank, this construction being effected by making the spring planks of Z-form in cross section with horizontal top and bottom flanges $21^a$ and $21^b$, the top flanges $21^a$ projecting over the brake beam. As shown in Fig. 2 these top flanges do not extend the full length of the spring planks but are cut off at each end at points just inside the brake heads to allow of movement of the latter.

It will be clearly seen by referring to Fig. 1 that material which may drop down upon or adjacent the brake beam will be prevented lodging in the space, indicated at $x$, between the latter and the spring planks and preventing release of the brakes.

I claim:

1. In a car truck, the combination with a brake beam and spring plank spaced laterally from one another, of a covering device extending across the space between the spring plank and brake beam, and projecting over the latter.

2. In a car truck, the combination with a brake beam and spring plank located substantially in the same horizontal plane and spaced laterally apart from one another, of a member connected at one side to the said spring plank and projecting therefrom over the brake beam and adapted to cover the space between the latter and the spring plank, for the purpose set forth.

3. In a car truck, the combination with the spring plank and brake beam extending adjacent each other, of a device located below the car body and adapted to cover the space between the spring plank and brake beam.

4. A car truck having its spring planks of Z-form in cross section with its flanges horizontally disposed and the top one projecting over the brake beam.

5. In a car truck, the combination with the spring plank and brake beam thereof, of a member formed integral with the spring plank and projecting over and adapted to cover the brake beam.

In testimony whereof, I have signed my name to this specification, in the presence of two subscribing witnesses.

WINFIELD HANCOCK YOST.

Witnesses:
ALEX CURRIE,
FRED. J. LAW.